United States Patent

Bukosky et al.

[15] 3,670,111

[45] June 13, 1972

[54] REPERTORY DIALER TELEPHONE SET WITH REGISTER STORAGE OF THE DIGITS

[72] Inventors: Allen A. Bukosky; Michael A. Flavin, both of Indianapolis, Ind.; Donald G. Hill, Boulder, Colo.; Donald D. Huizinga, Indianapolis; James F. Ritchey, Carmel, both of Ind.

[73] Assignee: Bell Telephone Laboratories, Incorporated, Murray Hill, Berkeley Heights, N.J.

[22] Filed: Dec. 2, 1969

[21] Appl. No.: 881,515

[52] U.S. Cl. ........................................179/90 B, 179/90 BD

[51] Int. Cl. ........................................................H04m 1/45

[58] Field of Search .............179/90 B, 90 BB, 90 BD, 90 AD

[56] References Cited

UNITED STATES PATENTS

| | | | |
|---|---|---|---|
| 3,511,933 | 5/1970 | Holmes | 179/90 B |
| 3,482,058 | 12/1969 | Guennou | 179/90 BB |
| 3,364,314 | 1/1968 | Huizinga | 179/90 B |
| 3,342,943 | 9/1967 | Aumuller | 179/90 B |
| 3,243,517 | 3/1966 | Miller | 179/90 BB |
| 3,428,758 | 2/1969 | Hall | 179/90 BB |
| 3,601,552 | 8/1971 | Barnaby | 179/90 B |
| 3,588,362 | 6/1971 | Kass | 179/90 B |
| 3,555,201 | 1/1971 | Kuehnle | 179/90 BD |
| 3,280,269 | 10/1966 | Brown | 179/90 BB |

FOREIGN PATENTS OR APPLICATIONS

| | | | |
|---|---|---|---|
| 1,036,467 | 5/1962 | Great Britain | 179/90 B |
| 1,093,184 | 10/1964 | Great Britain | 179/90 B |
| 1,110,606 | 6/1964 | Great Britain | 179/90 B |

*Primary Examiner*—William C. Cooper
*Assistant Examiner*—Tom D'Amico
*Attorney*—R. J. Guenther and Edwin B. Cave

[57] ABSTRACT

In an electronic type repertory dialer telephone set, direct station selection for recording or automatically dialing out is provided by a name button switch array, each button accessing an associated shift register memory. A clock pulser and counter circuit initiates an automatic call sequence in response to the electronic detection of dial tone after a particular memory has been designated.

3 Claims, 9 Drawing Figures

INVENTORS A. A. BUKOSKY
M. A. FLAVIN
D. G. HILL
D. D. HUIZINGA
J. F. RITCHEY

BY E. J. Chinder

ATTORNEY

REPERTORY DIALER TELEPHONE SET WITH REGISTER STORAGE OF THE DIGITS

BACKGROUND OF THE INVENTION

1. Field of the Invention

This invention relates to repertory dialer telephone sets and more particularly to sets of this type employing direct station selection.

2. Description of the Prior Art

Repertory dialer telephone sets are well known in the art and are becoming increasingly attractive to telephone subscribers in that they enhance both the convenience and speed of telephone use. Such apparatus provides for the recording of dial generated signals, either directly or in some translated form, typically by magnetic means such as a magnetic drum or tape for example. A subscriber may subsequently initiate the transmission of signals corresponding to a recorded directory number by physically aligning the readout mechanism with that portion of the memory where the number is recorded followed by the operation of a suitable call initiating switch. One repertory dialer of this type is disclosed by D. D. Huizinga and T. B. Prince in U.S. Pat. No. 3,364,314, issued Jan. 16, 1968.

Despite the obvious saving in time that is generally effected by prior art dialers, undue delays are encountered in some instances when the name of the party to be called cannot be readily located on the conventional scroll type directory. Other problems encountered in the prior art include the excessive mechanical precision that is required to ensure the necessary physical alignment between a specific memory slot and the readout mechanism.

One broad object of the invention is to reduce the cost of repertory dialer telephone sets. Another object is to enhance both speed and reliability in such sets.

SUMMARY OF THE INVENTION

The foregoing and additional objects are achieved in accordance with the principles of the invention by a repertory dialer telephone set employing solid state circuit elements throughout for both the memory function and the logic or control function. Each of the memory slots, which has the capacity to store a 15-digit directory number, employs a respective shift register ideally constructed from insulated gate field effect transistors (IGFETS) and each individual memory may advantageously be mounted on a respective silicon chip.

An array of party designating buttons or spaces is provided on the face of the set and each is associated with a mechanical switch or with a proximity switch so that touching or depressing the space or button that is identified with the printed name or other designator of the party whose number is to be called or recorded automatically accesses or electronically aligns a corresponding one of the memories. No mechanical alignment of any sort is required to access a memory either for recording or for calling.

One of the memory units is termed the last-number-dialed or LND memory. A number that is manually dialed by the pushbutton dial without first operating a record button or a name button is automatically recorded in this memory. Any number previously recorded in this slot is automatically erased. This arrangement provides a scratch-pad memory of the last number dialed which can be used to automatically redial the number by depressing an LND button.

The remainder of the electronics in a set in accordance with the invention comprises various control circuitry which provides overall logic, a dial tone detector, a detector-responsive clock pulser that provides timing for the set, a counter that provides output logic for the clock pulser and an in-out circuit that provides translating circuits for converting back and forth between the *n*-out-of-*m* (2 out of 6, for example) code used by the dial and the binary code required for the memory. Each of these four circuits, i.e., control, clock pulser, counter and in-out may advantageously be fabricated on a separate silicon chip in integrated circuit form which enhances testing and maintenance and ensures low cost and suitability for mass production.

Although the embodiment of the invention disclosed herein employs a pushbutton dial and contemplates the generation of multifrequency signals for transmission, the broad principles of the invention are equally applicable to the use of a rotary dial and the generation of steady state pulses. Modification of the set to incorporate such a dialing arrangement is neither shown nor described herein inasmuch as such modification may readily be accomplished by the utilization of conventional, skill-of-the-art technology.

DESCRIPTION OF AN ILLUSTRATIVE EMBODIMENT

Introduction

Figure 1:
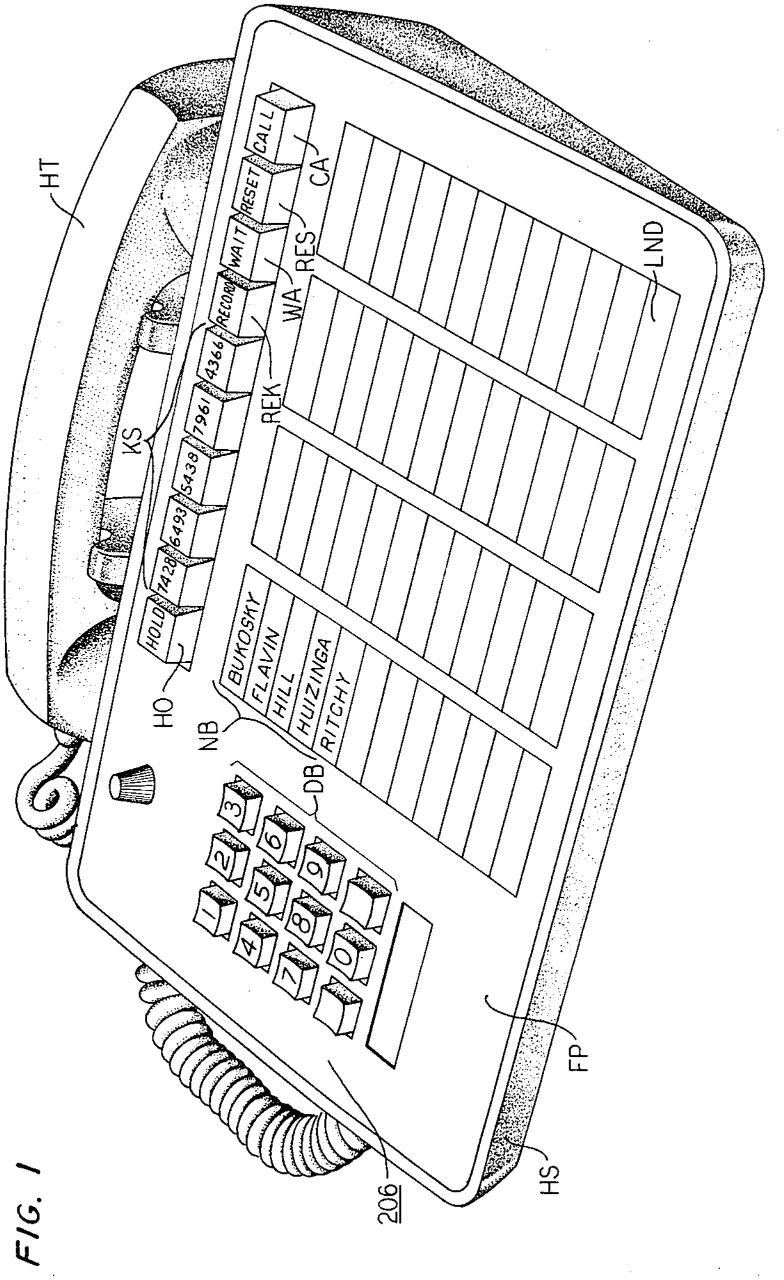
FIG. 1 is a sketch in perspective of the exterior of a direct station selection (DSS) repertory dialer telephone set in accordance with the invention.

As an aid to clarity, the detailed description of an illustrative embodiment has been divided into a number of different sections. General principles of operation are discussed first in terms of FIGS. 1 and 2, together with a broad outline of the operating sequences. The second section presents a complete and detailed operational description of the apparatus in terms of the schematic circuit diagram of FIGS. 4–9 and the final section lists and clarifies the specific functions of the logic components illustrated in FIGS. 4–9.

The following table lists the abbreviated notations used in the drawing, which notations will also be used in the course of the description:

TABLE 1

NOTATION

| | |
|---|---|
| ALLO | all 0 |
| BI | bits in |
| C | call |
| CA | call button |
| CB | contact bounce |
| CE | clock enable |
| CL | call lamp |
| CG1E | clock gate 1 enable |
| CR | cradle |
| d | digit |
| D | delay |
| DB | dial button or contact |
| DT | dial tone |
| F | flip-flop in a register |
| FC | fast clock |
| FF | flip-flop not in a register |
| FP | face plate |
| HS | housing |
| HT | handset |
| g | gate |
| H | home |
| HO | hold button |
| HE | home early |
| IN | inverter |
| INFO1 | information lead 1 |
| INFO2 | information lead 2 |
| IE | in enable |
| KS | key set station buttons |
| L | lead |
| LND | last number dialed |
| LNDC | last number dialed control |
| NA | name switch |
| NB | name button |
| OE | out enable |
| +PB | power for buttons |
| PC | power to trigger clock |
| −PG | power for IGFET load device gates |
| +PI | power for IGFET |

| | |
|---|---|
| | circuitry |
| +PL | power for lamps |
| +PR | power for relays |
| P16 | pulse during **16**th count in **SR30** |
| R | record |
| RES | reset button or contact |
| RL | record lamp |
| REK | record button or contact |
| RP | record protect |
| S | set |
| SH | switchhook lead |
| SHC | switchhook control |
| SW | switchhook |
| SR | shift register |
| W | wait |
| WA | wait button or contact |
| W2 | wait lead **2** |
| WDC | wait and dial common |
| 01 | the inversion of the clock pulse which shifts information |
| 02 | the clock pulse that breaks the feedback loop |
| 01G1 | **01** gated once |
| 02G1 | **02** gated once |
| 01G2 | **01** gated twice |
| 02G2 | **02** gated twice |

Functional Description: General

Figures 2, 3:
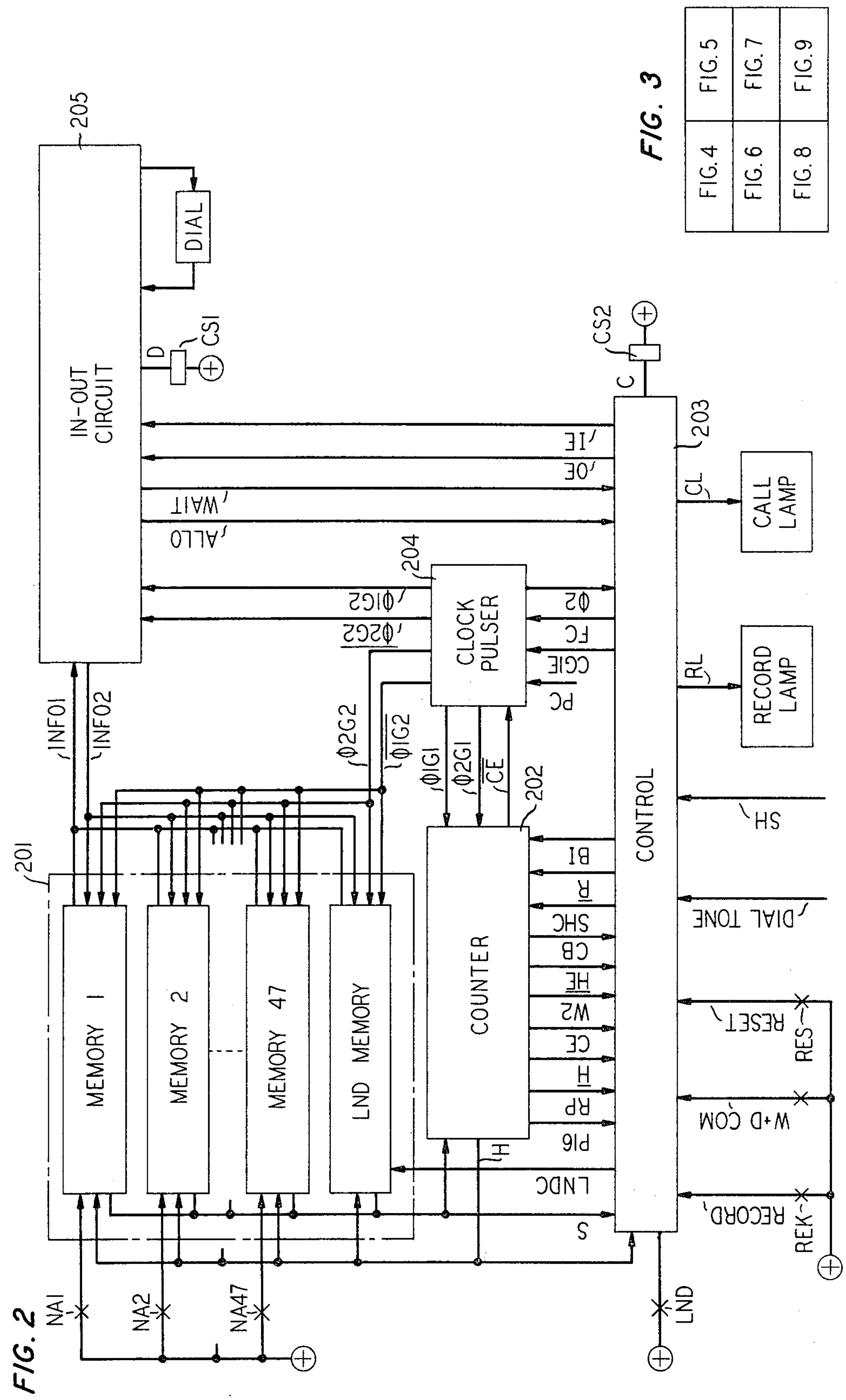
FIG. 2 is a block diagram of the circuitry of the set shown in FIG. 1.
FIG. 3 is a block diagram showing the relationship among FIGS. 4 through 9.

As shown in FIG. 1, a DSS telephone in accordance with the invention includes a main housing portion HS together with a handset HT resting on a cradle CR mounted at the rear. A row of operating buttons across the top portion of the housing HS includes the usual hold HO, record REK, wait WA, reset RES and call buttons CA, together with five buttons KS which provide conventional key set operation. Each of the printed names displayed on the face plate FP of the housing HS covers a switch NA, which, for example, may be a membrane switch or a proximity switch of the type shown by R. L. Cerbone, M. A. Flavin, N. R. Hall and J. W. Rieke in a copending U.S. patent application, Ser. No. 541,191, filed May 25, 1967. A single NA contact, FIG. 2, is closed when any name location or button NB is pushed. When the actuation or depression of a name button NB is referred to herein, it necessarily implies the operation of a corresponding one of the NA switches.

The logic and memory of the unit, as shown in FIG. 2, is divided essentially into five blocks 201–205, each of which may advantageously be fabricated as a separate insulated gate field effect transistor integrated circuit (IGFET IC) chip. The memory chip 201 comprises 48 individual memory units, three of which, memory 1, memory 2 and the LND memory, are shown. Each of these units has the capacity for storing a respective 15-digit number which gives the set a total capacity of 48 numbers available for automatic dialing. The memory 201 along with the four logic chips, which include a counter 202, a control 203, a clock pulser 204 and an in-out chip 205, may be advantageously bonded to a single ceramic substrate. The interconnections shown in FIG. 2 between these chips are largely functional. However, the relation between these functional connections and the actual physical connections will be made clear in the course of the detailed description of the circuitry in FIG. 3. Each of the individual units in the memory 201 includes a 60-bit shift register along with a number of logic elements. As indicated above, these shift registers perform the memory function for the set which function is carried out by the utilization of a modified BCD binary code. Relevant code relations are listed in the following table:

TABLE II

| Decimal number or DSS signal | Modified DCD code A | B | C | D | Multifrequency 2 out of 7 code |
|---|---|---|---|---|---|
| 1 | 1 | 0 | 1 | 0 | L1, H1 |
| 2 | 1 | 0 | 0 | 1 | L1, H2 |
| 3 | 1 | 0 | 1 | 1 | L1, H3 |
| 4 | 0 | 1 | 1 | 0 | L2, H1 |
| 5 | 0 | 1 | 0 | 1 | L2, H2 |
| 6 | 0 | 1 | 1 | 1 | L2, H3 |
| 7 | 1 | 1 | 1 | 0 | L3, H1 |
| 8 | 1 | 1 | 0 | 1 | L3, H2 |
| 9 | 1 | 1 | 1 | 1 | L3, H3 |
| * | 0 | 0 | 1 | 0 | L4, H1 |
| 0 | 0 | 0 | 0 | 1 | L4, H2 |
| # | 0 | 0 | 1 | 1 | L4, H3 |

TABLE II—Continued

| Decimal number or DSS signal | Modified DCD code A | B | C | D | Multifrequency 2 out of 7 code |
|---|---|---|---|---|---|
| WAIT | 1 | 0 | 0 | 0 | |
| ALLO | 0 | 0 | 0 | 0 | |
| Unused 1 | 0 | 1 | 0 | 0 | |
| Unused 2 | 1 | 1 | 0 | 0 | |

| Boolean equations relating BCD to 2 out of 7 | Boolean equations relating 2 out of 7 to BCD |
|---|---|
| $L1=A\overline{B}(C+D)=A\overline{B}\overline{\overline{C}\overline{D}}$ | $A=L1+L3+W+$unused 2. |
| $L2=\overline{A}B(C+D)$ | $B=L2+L3+$unused 1+unused 2. |
| $L3=AB(C+D)$ | $C=H1+H3$. |
| $L4=\overline{A}\overline{B}(C+D)$ | $D=H2+H3$. |
| $H1=C\overline{D}$ | |
| $H2=\overline{C}D$ | |
| $H3=CD$ | |
| $W=A\overline{BCD}$ | |
| $ALLO=\overline{ABCD}$ | |
| $d=C+D=\overline{\overline{C}\overline{D}}$ | |

As shown in Table II, a total of four binary bits are required to store each decimal digit and a maximum of 15 digits are permitted for each number. The normally open NA contacts that provide inputs to the individual memory units or chips are controlled by the NB buttons shown in FIG. 1. A closure of any one of these contacts connects a positive power supply, which denotes a logical 1, into the corresponding memory chip. This signal accesses the associated memory register.

The dial 206, also shown in block form in FIG. 2, may be a substantially conventional multifrequency signal generator of the type shown by R. L. Breeden and R. M. Rickert in U.S. Pat. No. 3,424,870, issued Jan. 28, 1969, modified however to include a set of extra contacts (not shown) associated with each of the dial buttons DB. These contacts provide an output from the dial to the logic when the dial buttons are operated, which output is in the same 2-out-of-7 code (see Table II above) that operates the frequency contacts in the dial oscillator. In actual practice, it is a 2-out-of-6 code that is employed to feed the logic since the seventh input is not used.

Figure 5:
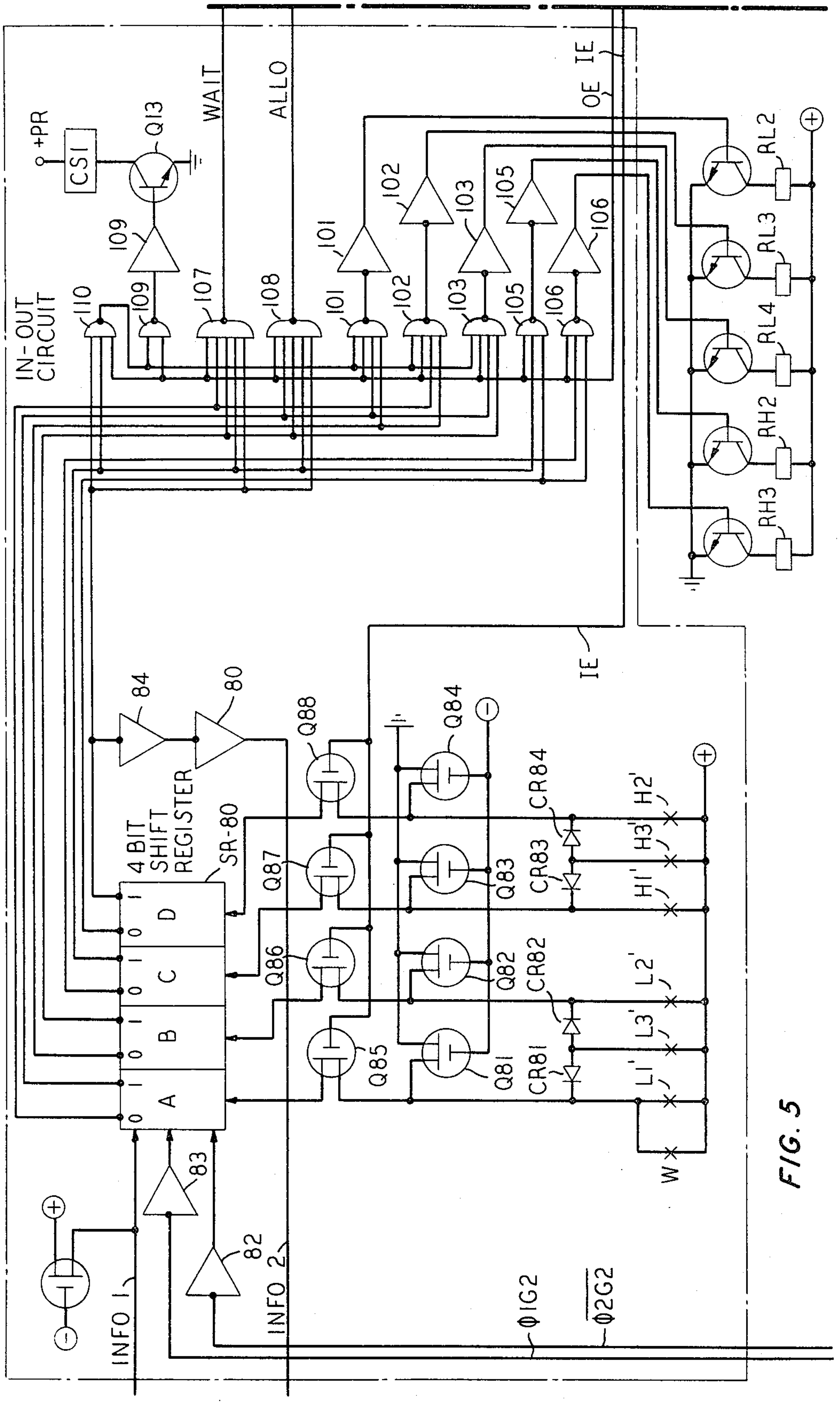

The in-out chip 205 contains a translate-in circuit, a translate-out circuit and a four-bit shift register, designated SR80 in FIG. 5. The translate-in circuit encodes the 2-out-of-6 information read-in from the dial 206 into the binary code used for storing, whereas the translate-out circuit decodes the binary information back into the 2-out-of-7 code used in the multifrequency dial. The shift register SR80, shown in FIG. 5, accepts either parallel or serial read-in or read-out. Each digit to be stored in a memory is read into SR80 from the dial 206 in a parallel fashion and is then fed out serially to the memory. When the digit is to be dialed out, it is fed serially into the shift register from the memory, and read out in parallel to operate the dial. It is then read serially back into the memory so that it will not be lost. During the dialing of each digit, one of the outputs from the shift register operates a common switch relay CS1, shown in FIG. 2, which applies power to the oscillator (not shown) of the dial 206.

Figure 6:
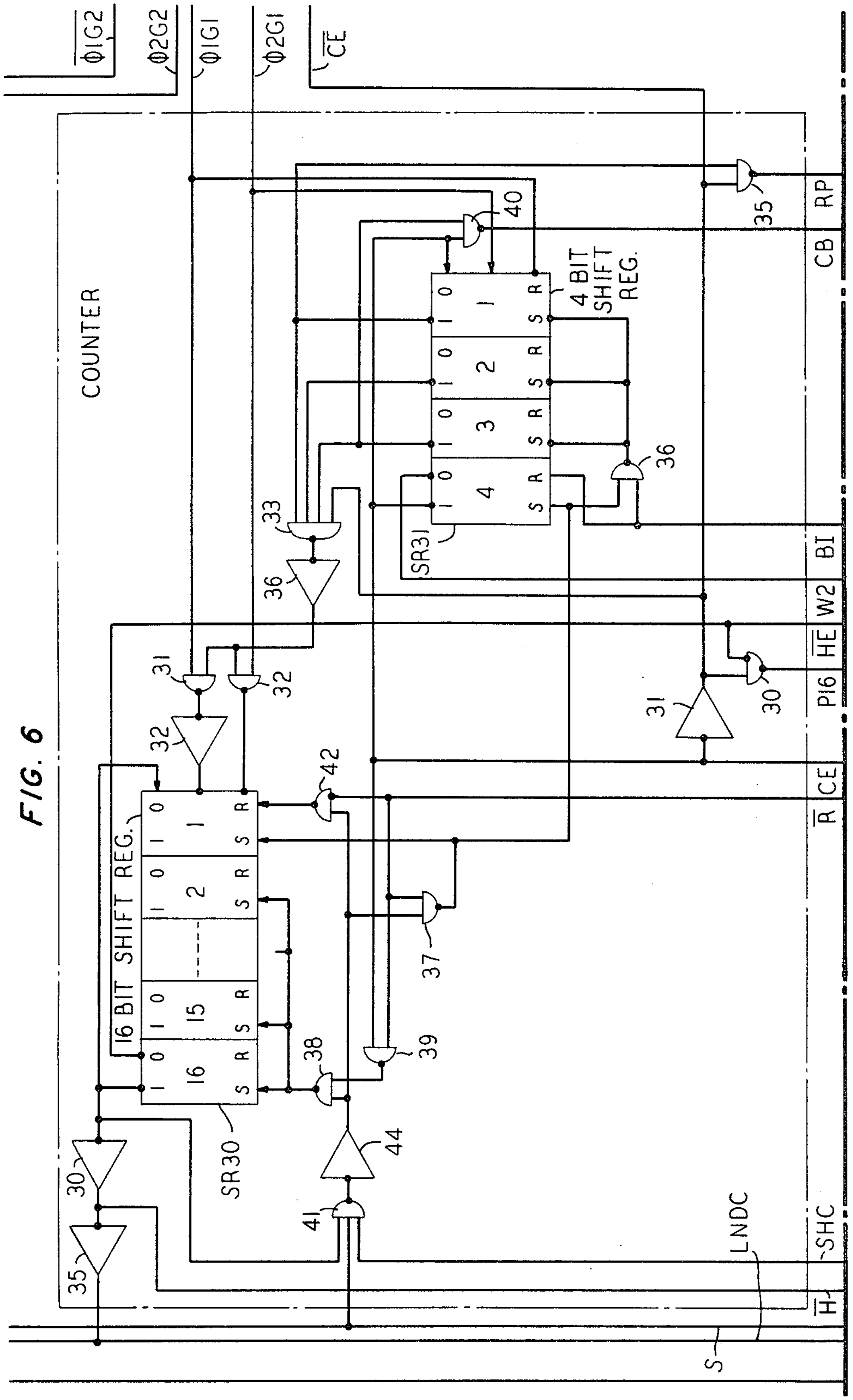

The counter chip 202 includes a four-bit shift register and a 16-bit shift register SR31 and SR30 respectively as shown in FIG. 6, together with several logic gates. Clock pulses are counted on this chip by the two shift registers and information is put out as a result of the count which is employed to control the logic cycle. The four-bit shift register, which is wired to enable it to count up to eight and to produce an output signal for every four counts, operates on a bit-by-bit basis. During the first four counts or clock pulses, four binary bits constituting one decimal digit are shifted from the memory to the shift register SR80 in the in-out circuit 205. During the next four pulses, this digit is read out of SR80 in parallel to operate the dial 206. During the record cycle, the inputs to this counter are such that it only counts to four since the readout counts are not needed.

The 16-bit shift register operates on a digit-by-digit basis. A running tabulation of the number of decimal digits which have been shifted from memory is kept in this counter. A call cycle is initiated by setting all bits in the register thus preparing it to begin its count, and a single bit is reset each time a decimal digit is shifted out of the memory. When all 15 digits, or digit positions, have been cycled through the memory of interest, all bits in this counter are reset thus causing it to produce signals which end the cycle. The 16-bit counter functions in a similar fashion during a record cycle except that the first flip-flop in the register is never set during recording. This exception arises owing to the fact that only 15 shifts from memory to SR80 are needed during a record cycle whereas 16 are required for a call cycle.

Clock pulses are generated and gated on the clock pulser chip 204 with the primary function of these pulses being to operate the shift registers. A 60 Hz A.C. signal on the PC lead triggers the clock every 17 milliseconds thus controlling the clock pulse rate. During resetting of the logic, the signal from the PC lead is locked out and the clock runs freely at a rate slightly below 16 KHz.

The logic on the control chip 203 accepts inputs from the NA contacts and from the other chips and provides outputs which control the operation of the unit. The LND contact provides access to the scratch-pad memory described briefly hereinabove. The record contact REK is used to place the set in the record mode. Any time a digit button DB is pressed, the wait and dial common WDC contact, which is operated either by the wait button WA or by a conventional dial common switch arrangement, i.e., it is operated by any dial button DB, closes to signal the logic that a digit is to be recorded. A closure of the reset contact RES causes the logic to reset itself.

At this point some additional explanation concerning the reset function is in order. As indicated above, information read out from any one of the units of the memory 201 is read back serially into that unit after it is used. This action requires that a complete shifting cycle be accomplished in order to return the logic back into the home position after a number is called regardless of how many digits are in the number and regardless of whether the entire number is dialed. Thus, "resetting" the logic means running it through whatever portion of an uncompleted cycle that may remain, and this function must be carried out before any new cycle can begin.

Switchhook logic is employed for resetting whenever the switchhook SW changes states with the dialer out of home. The SH lead to the control chip 203 comes from a filtering circuit (not shown) which monitors line voltage on the set side of the switchhook SW. This lead goes to a logical 1 when the handset HT is on-hook and to a 0 when off-hook. The logic is automatically reset whenever a transition between these states occurs. This arrangement ensures that the logic will be reset at the start of any call cycle.

Pushing the record button REK also resets the dialer if it is out of home. This action ensures that it will be reset for recording on-hook. However, the user may record on-hook and neglect to push the reset button RES thus leaving the dialer out of home. Then at some later time he may decide to record another number on-hook without having gone off-hook since the last recording. Thus if it were not for the resetting action of the record button REK, it would be possible to record the new digits on the end of a previously recorded number rather than into the desired memory slot. It should be emphasized at this point that the primary purpose for the reset button RES and for the resetting function of the act of going on-hook is to reset the dialer to a home position so that when the set is not in use, readiness for the call mode is ensured. This arrangement also prevents idle pushing of the digit buttons DB on the dial from adding digits to a previous recording. Nevertheless, if the user fails to push the reset button RES after recording, the function described will obviously not be accomplished.

Automatic dialing can occur only if a signal from a dial tone detector circuit, not shown, is applied to the control chip 203 by way of a dial tone lead DT. Outputs from the control chip 203 operate the record lamp RL during recording and the call lamp CL and common switch relay CS2 during calling. The CS2 relay disconnects the telephone set network (not shown) from the dial, connects the equalization network (not shown) to the dial and may also be utilized to provide additional functions associated with speakerphone use.

Functional Description: Record Mode

To initiate the record mode, the user presses the record button REK, assuming the set is on-hook. Pressing the record button REK causes an output from the control chip 203 to the counter chip 202 on the SHC and $\overline{R}$ leads. The user then presses a name button NB to operate one of the contacts such as NA1, for example, thus causing an output from the memory 1 chip to the counter chip 202 on the S lead. These three outputs, SHC, $\overline{R}$, and S cause the counter chip 202 to be set in a manner unique to the record mode of operation. Leads H, $\overline{H}$ and $\overline{HE}$ then provide outputs from the counter to the memory and control chips. The H signal that goes to the memory chip 201 combines with the signal from the activated name switch NA1 to maintain memory chip 1 active and available while ensuring that other memory chips cannot be activated by a subsequent NB button operation. The H, $\overline{H}$, and $\overline{HE}$ signals that go to the control chip 203 set up the circuitry on this chip for operation.

Actual recording is begun by pressing one of the dial buttons DB corresponding to the first digit of the number to be recorded. This action provides digit information in a 2-out-of-6 code on the six leads from the dial 206 to the in-out chip 205.

At the same time, an input is provided from the WDC contacts to the control chip 203. This input induces a signal from the control chip to the counter 202 on the BI lead and to the in-out chip 205 on the IE lead. The signal on the BI lead sets part of the counter that was not set previously and induces a signal on the CB lead from the counter to the circuit of the control chip. The signal on the IE lead then causes the in-out circuit to accept information from the dial.

When the dial button DB is released, the signals on the dial leads, the WDC lead, the IE lead and the BI lead all cease. The signal on the IE lead should cease before the signals from the six dial leads to the in-out chip 205 return to normal. Without this sequence, all 0's rather than the desired digit would be entered into the in-out chip. When the WDC contacts return to normal, the signal on the CB lead operates on the control circuit 203 and causes an output on the CG1E lead. This output causes the clock pulser 204 to start delivering clock pulses 01 and 02 to the other chips in the logic. The clock runs for five clock pulses after it receives the input on the CG1E lead.

A signal on lead $\overline{CE}$ prevents the first clock pulse from being applied to the memory or in-out chips. After two clock pulses are generated, there is an output provided on the RP lead from the counter 202 to the control chip 203. This output has the effect of inhibiting further inputs from the dial buttons DB until the clock stops running. During the last four clock pulses, the information encoded into the in-out chip 205 by the dial 206 is transmitted on the INF02 lead to the activated memory. At the same time, four bits of information are transferred from the activated memory to the in-out chip 205 on the INFO - LEAD.

If the number being recorded is to be called out from behind a PBX, a wait for a second dial tone is normally required. A wait period can be encoded by the user by pressing the wait button WA on the telephone set. This action feeds the wait code into the in-out chip 205 as a signal on the leads from the dial 206 and also provides a closure of the wait and dial common contact WDC. In this fashion, the customer can continue to encode digits or wait information for as many as 15 digits. A wait period counts as one digit. If a user wishes to stop before fifteen digits have been encoded, he can go off-hook or depress the record button REK or the reset button RES. In either case, he will cause the FC lead to provide an input to the clock pulser 204 to speed it up. With no additional buttons pushed, the clock runs the logic to a home position and all 0's are recorded in the rest of the memory. When the counter has counted fifteen digits it changes output signals on the H, $\overline{H}$, and $\overline{HE}$ leads that go to the memory and control chips. This action causes the circuits in these blocks to be reset to their original condition. A pulse on the PI6 lead serves to reset part of the logic in the control block during the last 75th clock pulse.

The LNDC lead is used to activate the LND memory. Recording into the LND memory is accomplished in the same fashion as described above for recording into any other memory. When the LND button is pressed, a signal is applied to the LNDC lead which activates the LND memory. If the phone is off-hook, however, and the user is manually dialing a call from the set, a signal is applied to the SHC lead. Thus, when a dial or digit button DB is pressed, the WDC signal is combined with the SHC signal to provide a signal on the LNDC lead to the LND memory. This action activates that memory and causes the dialed number to be recorded there in the same manner as recording is accomplished in any other one of the memories.

Functional Description: Call Mode

To initiate the call mode, the user goes off-hook and then actuates the desired name button NB. This action causes outputs to occur on the SHC and S leads. These two outputs combine in the counter circuit 202 causing it to set. Since the record mode signal is not present on the $\overline{R}$ lead, the counter 202 is set in a fashion appropriate to the call mode of operation. Outputs on the H, $\overline{H}$, and $\overline{HE}$ leads function much as they would in the record mode. Additionally, they cause the CS2 relay to operate and the call lamp CL to light. There is also an output on the CE lead to the clock pulser which prepares it to transmit pulses to the memory and in-out chips. The control circuit does not allow dialing to start until an input from the dial tone detector (not shown) is applied to the dial tone lead DT. At that point, the CG1E lead provides an input to the clock pulser which starts it running. The first four clock pulses are transmitted to the counter 202, the activated memory chip and the in-out chip 205. Four bits of information are moved from the activated memory to the in-out chip as a result of these pulses.

After the first group of four clock pulses have been generated, the signal on the CE lead changes to a 0 and prevents the next group of four pulses from reaching the memory or in-out chip. During this second set of clock pulses, signals on the CE and OE leads cause the information in the in-out chip to tune the dial 206. At the same time, the CS1 relay is operated which provides power to the dial oscillator (not shown). During the third set of four clock pulses the OE lead disables transmission of information from the in-out clock 205 to the dial 206 and the $\overline{CE}$ lead causes four more bits of information to be transferred from the memory chip to the in-out chip and vice versa. In this fashion, information is shifted from the in-out chip 205 to the memory chip 201, four bits or one decimal digit at a time.

If a wait code is detected in the in-out chip 205, an output appears on the WAIT lead to the control chip 203. This output is provided during the time that a digit would customarily be dialed out, but no digit is dialed. At the end of the four clock pulses, during which period a digit would normally be dialed out, a signal on the W2 lead occurs. This signal combines with the signal on the WAIT lead and causes the output on the CG1E lead to change to 0. The clock pulser 204 then stops and the logic waits for dial tone. When dial tone occurs, the output on the CG1E lead enables the clock pulser 204 to run again and dialing continues.

When all digits in a number have been dialed, the logic is reset and the counter changes the output on the H, $\overline{H}$, and $\overline{HE}$ leads. Additionally, a signal on the P16 lead operates on the control chip 203 as in the record mode. If before all digits have been dialed, an all 0 code is detected by the in-out chip 205, a signal is provided to the control chip on the ALLO lead. This signal causes the OE lead to become deactivated and the FC lead to be active. The clock then runs rapidly to its home position with no more signals being transmitted from the in-out block 205 to the dial 206. While the unit is running at high speed, the rest of the information in the memory is cycled to its home position and the logic returns to a standby state.

Circuit Description: General

As a preface to a discussion of the operation of the dialer in terms of the detailed circuitry shown in FIG. 3, some further explanation of the notation employed will be useful. The gates, inverters, flip-flops, shift registers and transistors which are not part of the specific logic packages incorporated on the chips included in the blocks shown in FIG. 2 are individually numbered in FIG. 3 for reference. The numbering arrangement followed assigns each chip unique groups of numbers. Some of the chips have more than a single sequence of numbers employed to designate the components. Generally, however, the separate numbered sequences are assigned to separate functions on the chip. Thus, numbers 1 through 29 are assigned to that part of the logic on the control chip 203 which accepts inputs from outside, whereas numbers 60 through 69 are assigned to those elements that accept inputs from other chips. On the clock pulser chip 204, numbers 90 through 99 apply to the clock and numbers 70 through 79 apply to the gating that controls the clock pulses. The 80's on the in-out chip 205 apply to the buffer register and the 100's to the translate-out circuit.

Abbreviated notation is used in referring to the logic elements. Thus for example, gate 32 is referred to as g32, inverter 32 as IN32, flip-flop 32 as FF32, delay 32 as D32, shift register 32 as SR32, and transistor 32 as Q32. The internal flip-flops or "bits" in the shift registers are referred to by a single F, as opposed to FF for external flip-flops. The input leads to the gates are also indicated by number and are numbered from top to bottom, or from left to right, as the case may be.

Logic states are shown by the use of a 1 or a 0 at various points throughout the circuit. These are the states of the logic in the reset condition. The states shown in the clock circuit are the states the circuit would have been clock pulses.

Circuit Description: Record Mode

Figure 8:
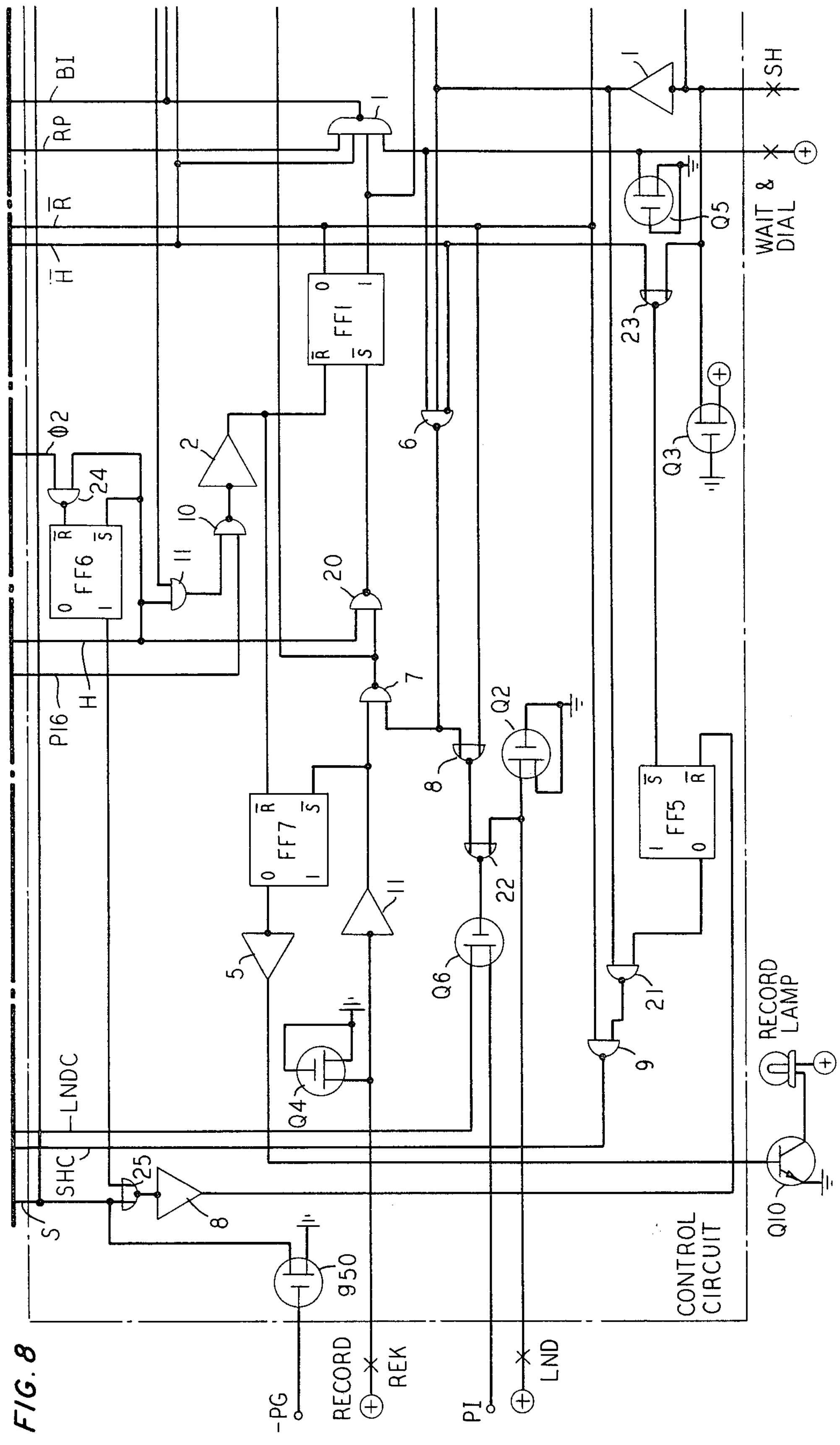

The dialer is placed in the record mode by setting FF1, FIG. 8, of the control unit which is accomplished by pushing the record button REK, FIG. 8, or, with the phone off-hook, pushing a dial or digit button DB, FIG. 1, which in conventional fashion operates one of the frequency switches L1′–L3′ and one of the frequency switches H1′–H3′ of FIG. 5. If the record button REK is operated, FF7, FIG. 8, in the control chip is also set and the record lamp RL is lighted. Setting FF1 inhibits *g*37 in the counter 202, FIG. 6, so that SR31 in the counter and F1 of SR30, also in the counter, will not be set by a signal on the S lead; enables *g*42 so that F1 of SR30 is held reset; enables *g*38 by way of *g*39 so that SR30 can be set during the record mode without having SR31 set; enables *g*8, FIG. 8, in the control chip so that it can activate the LND memory, FIG. 4, and set SR30, FIG. 6, during LND recording; activates *g*9, FIG. 8, to allow recording on-hook; inhibits *g*2, FIG. 9, to lock out dial tone; inhibits *g*26 to prevent lighting the call lamp CL during the record mode; inhibits *g*63; also in control, to prevent information from being read out; inhibits *g*65 so that CS2 will not be operated; enables *g*1, FIG. 8, to permit digits to be recorded and SR31, FIG. 6, to be set; deactivates *g*15, FIG. 9, so that the dialer can be reset by a switchhook transition; enables *g*64, FIG. 9, to cause 0's to be recorded as the dialer cycles home after recording; and enables *g*61 to allow control of the clock pulser by way of this gate during recording.

Figure 4:
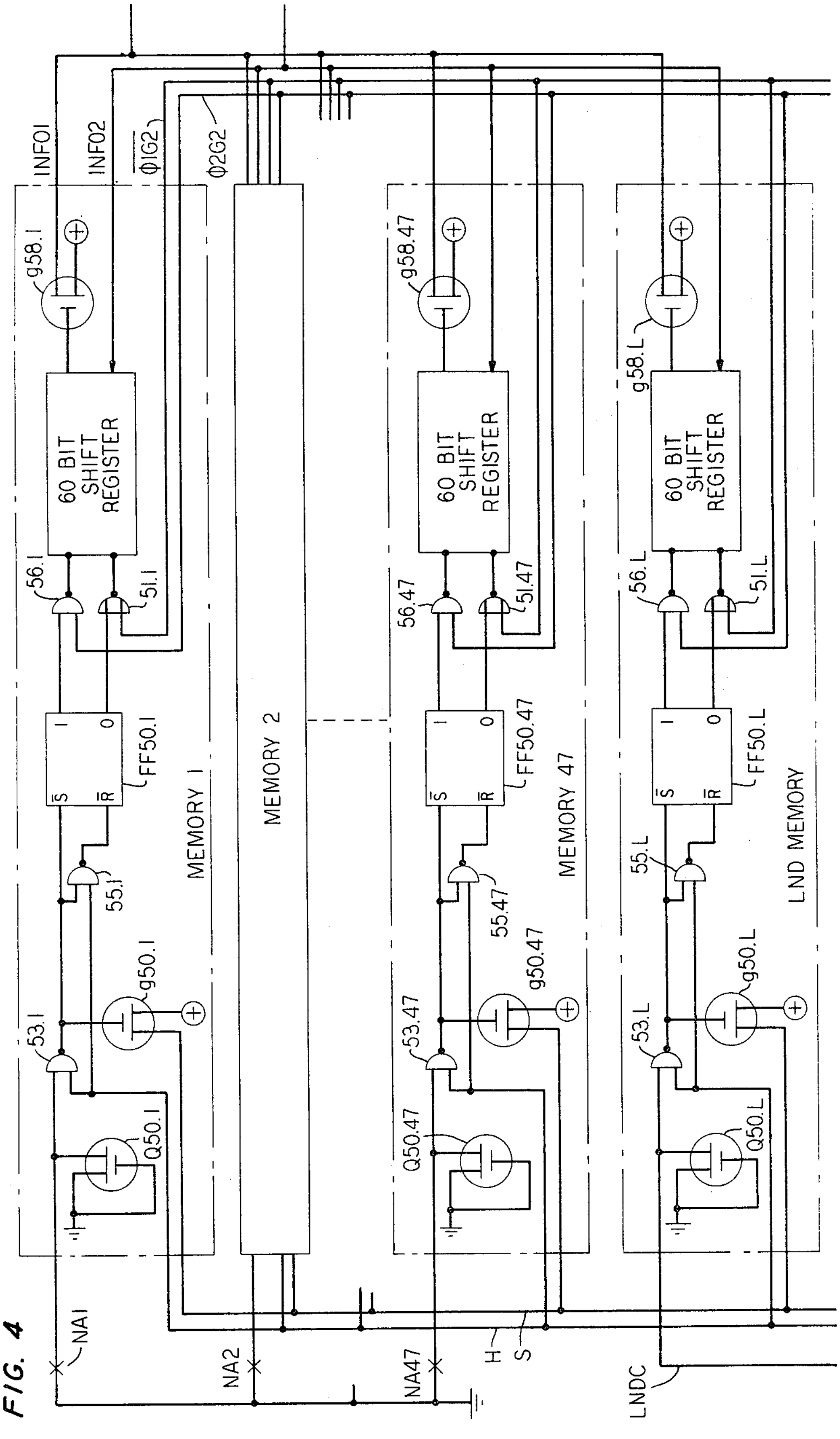
FIGS. 4 through 9 present a detailed circuit diagram, partially in block form, of the circuit shown in FIG. 2.

The operation of one of the name buttons or switches NA1 through NA47, FIG. 4, or, in the case of LND recording, pushing a dial digit button DB, FIG. 1, activates the appropriate *g*53 (i.e., one out of the gates 53.1–53.L) and sets the respective FF50. Setting FF50 accesses a particular memory register by way of the associated *g*51 and *g*56 gates. Activating *g*53 produces a 1 at the output of *g*55, thus removing the reset signal from FF50. Activating *g*53 also produces a 1 at the output of *g*50, FIG. 8, on the S-lead, which eventually induces a 0 at the output of *g*38, FIG. 6, so that all of the F's in SR30 are set with the exception of F1 which is held reset by *g*42. Setting F16 in SR30 causes a 1 to appear on leads $\overline{H}$ and $\overline{HE}$ and a 0 on the H-lead. The signal on the H-lead holds the outputs of *g*53 and *g*55, FIG. 4, at 1 thus preventing any change in the state of any of the FF50's during the record cycle. The signal on the H-lead also holds FF6, FIG. 8, set which disables *g*25 and prevents the 0 on the S-lead from reaching FF5. This arrangement is necessary in order to avoid the possibility of two memories being accessed at once if the user should depress too many buttons during a call cycle. The signal on the H-lead also inhibits g11 to prevent FF1 from being reset until the end of the record cycle and inhibits *g*20 to prevent FF1 from being set during a call cycle.

Figure 9:
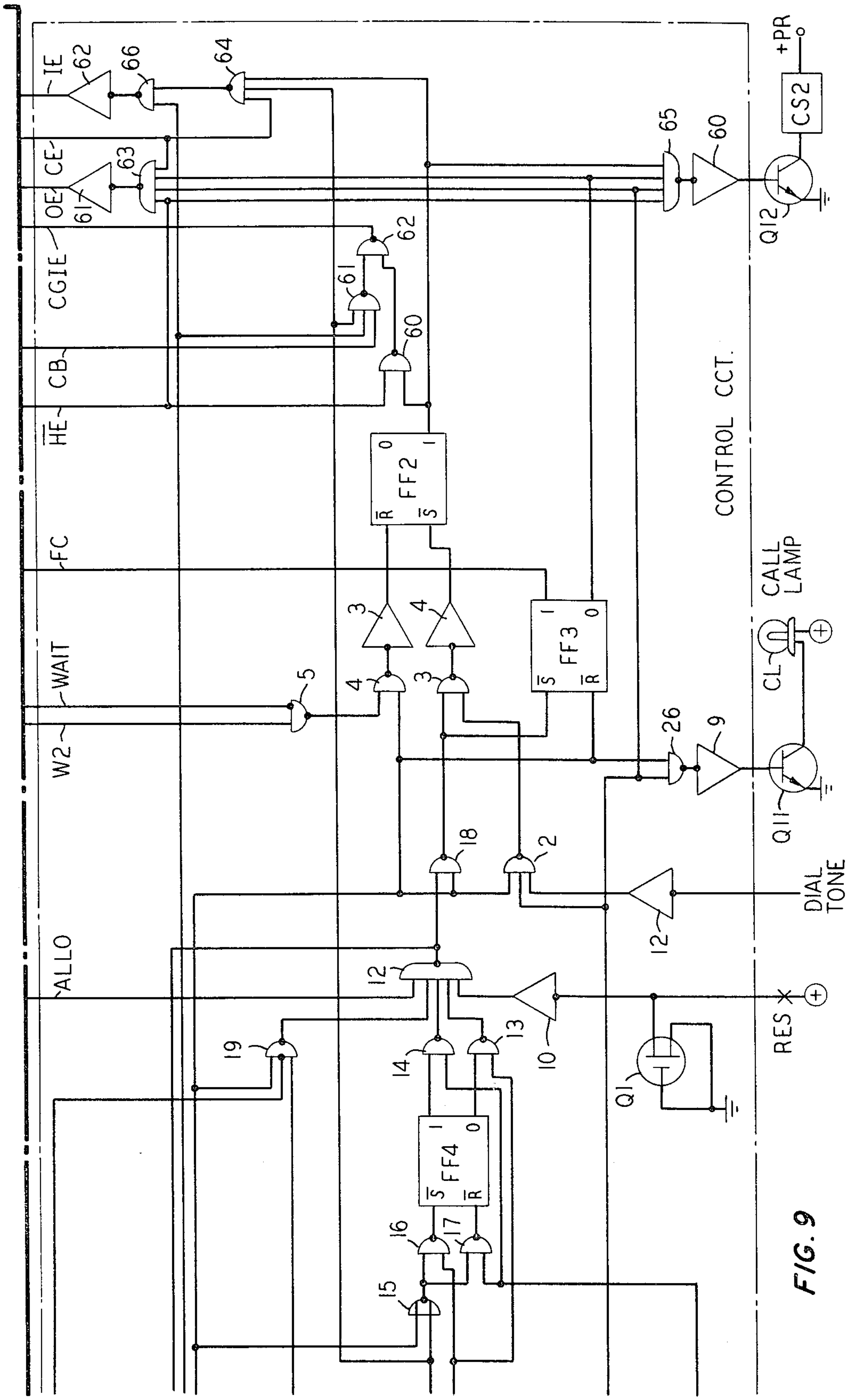

The 1 on the $\overline{HE}$ lead enables *g*60, FIG. 9, permitting it to function if the dialer is reset after recording but *g*63 and *g*65 are unaffected since they are inhibited by the signal on the $\overline{R}$-lead. The 1 on the $\overline{H}$-lead enables *g*1, FIG. 8; disables *g*16 and *g*17 via *g*15, FIG. 9, thus allowing switchhook transitions to activate *g*12 and produce a reset signal; enables *g*19 so that the unit can be reset by operating the record button REK, FIG. 8; and removes the reset signal from FF2 and FF3, FIG. 9, (FF3 via *g*4) so that they can be set if a reset signal is given.

Figure 7:
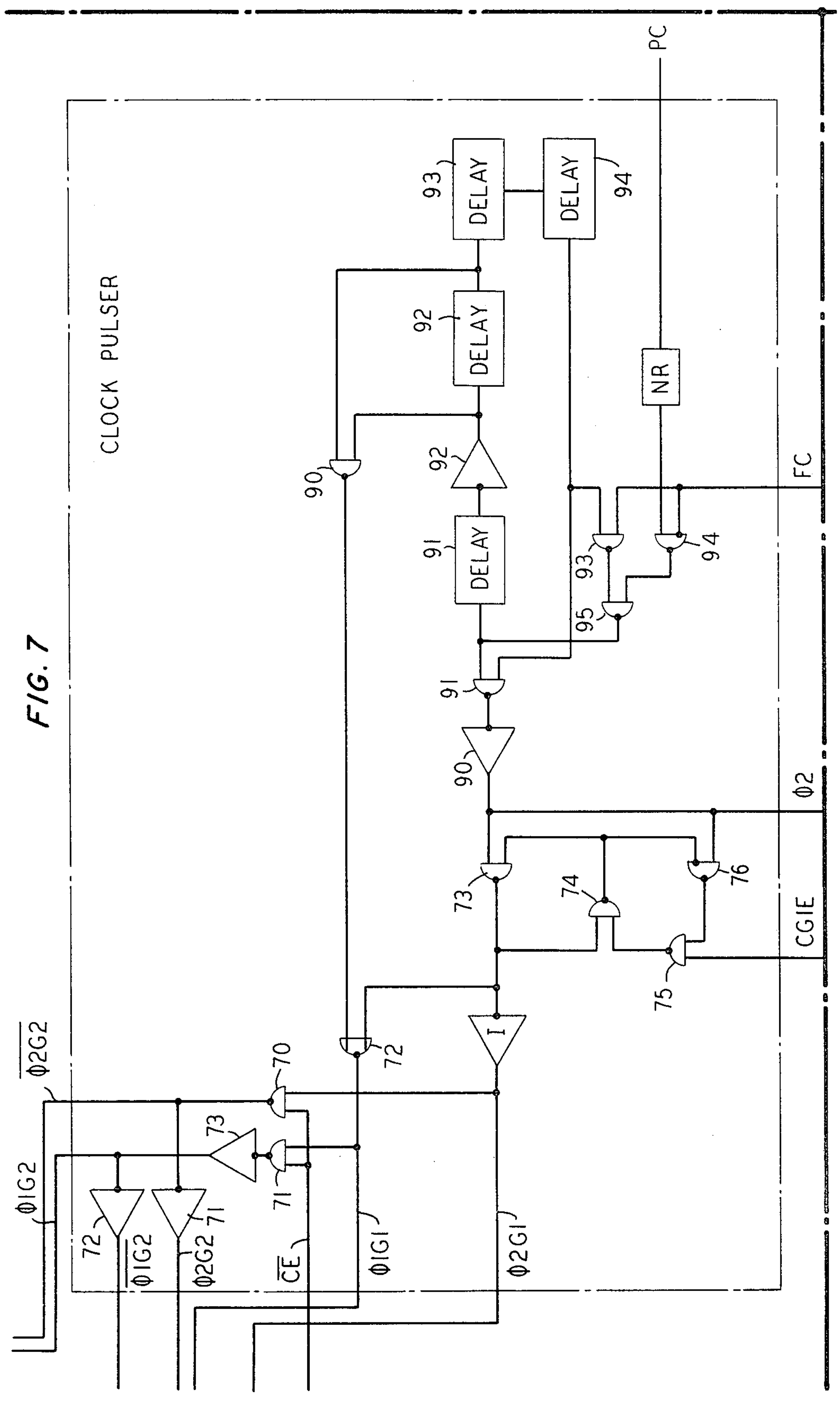

Operating a digit button DB activates *g*1, FIG. 8, which produces a 0 on the BI lead. This 0 sets SR31, FIG. 6, except for F4 which is held reset, enables the translate-in circuit by way of g66, FIG. 9, and inhibits *g*61 so that the clock pulser, FIG. 7, is prevented from pulsing out. Setting SR31, FIG. 6, puts a 1 on the CB lead which prepares *g*61, FIG. 9, to enable the clock pulser when the 0 on the BI lead changes to a 1. When the digit button is released, the signal on the BI lead becomes a 1 which inhibits the translate-in circuit, FIG. 5, and activates *g*61, FIG. 9, permitting the clock pulser to pulse out. The first clock pulse simply sets F4 of SR31, FIG. 6, by shifting a 1 from F3 into F4. This action produces a 1 on lead $\overline{CE}$ which enables *g*70 and *g*71, FIG. 7. The next four pulses shift the four bits of information just stored in SR80, FIG. 5, to the appropriate memory unit and also shift 0's to SR31, FIG. 6. After the second clock pulse, *g*35 produces a 0 and prevents any effect that operation of a digit button otherwise might have. After four clock pulses, *g*33 is activated so that the fifth clock pulse causes F2 in SR30 to be reset as well as F4 in SR31. The resetting of F4 in SR31 produces a 0 on the CB lead which stops the clock pulser and also puts a 1 on the RP lead which enables *g*1 again. At this point the dialer is ready for another digit and the cycle described continues until all digits have been recorded.

When the recording is finished, the user presses the reset button RES, FIG. 9, or hangs up or he pushes the record button REK, FIG. 8, to make another recording. In any event FF2 and FF3, FIG. 9, will be set. FF3 speeds up the clock and FF2 activates *g*60 and causes the dialer to run continually until it is restored to a home position. FF2 also enables *g*64 so that it is activated whenever the signal on lead CE is a 1, which is the same condition that obtains during a recording period. This condition causes all 0's to be recorded as the dialer cycles to its home position, assuming that no dial buttons are depressed during this period.

When the final clock pulse of the cycle comes through, it activates *g*30 and causes FF1 and FF7, FIG. 8, to be reset, taking the dialer out of the record mode. This same clock pulse causes F16 of SR30, FIG. 6, to be reset which stops the clock pulser and returns the dialer to the home condition. If the dialer is reset in response to pressing the record button REK, FIG. 8, FF1 will be immediately set again when the unit reaches the home position. This action leaves the dialer in the record mode ready for recording. When the dialer comes to rest, the information in SR80 is the last four bits that were in the memory before recording. It may be any combination of 1's and 0's, which is of little consequence inasmuch as this information is not used.

Circuit Description: Call Mode

A call is initiated by going off-hook and depressing one of the name buttons NB, FIG. 1, to operate a corresponding one of the name switches NA, FIG 4. This action sets SR30 and SR31, FIG. 6. Note that SR30 cannot be set until SR31 is set, enabling *g*38 and *g*39. An otherwise potential timing problem discussed hereinbelow in connection with the description of the function of *g*63 is thereby avoided. The setting of SR31 enables *g*38 so that SR30 can be set, enables *g*70 and *g*71, FIG. 7, so that clock pulses can shift information from the memory to SR80, and inhibits *g*63 so that the translate-out circuit will not be enabled during shifting. Gates 61 and 64, FIG. 9, are inhibited during the call cycle by FF1.

When SR30, FIG. 6, is set, the call cycle starts in much the same way as the previously described record cycle. The signals from SR30 (H, $\overline{H}$, and $\overline{HE}$) enable *g*60 to allow the clock pulser 204 to run; enable *g*65 so that the common switch relay CS2 can operate; enable *g*63 to permit the translate-out circuit to be enabled; enable *g*2 so that dial tone can be received by the unit; activate *g*26 thus lighting the call lamp CL; and disable *g*20 to prevent FF1 from being set during the call cycle.

When dial tone is applied, it sets FF2, FIG. 9, which activates *g*60 and *g*65. The output of *g*60 starts the clock pulser 204 and the output of *g*65 operates CS2 which performs part of the common switch functions. With the clock pulser running, information is shifted out of the proper memory into SR80, FIG. 7, for four pulses. The fourth pulse resets F1 of SR30 and F4 of SR31, FIG. 6. This changes the signal on lead CE to a 1 which inhibits *g*70 and *g*71, FIG. 7, and activates *g*63, FIG. 9. Gates 70 and 71 stop the shifting of information from memory to SR80, and *g*63 causes the information in SR80 to be read out to the dial 206. If this information is a digit to be dialed, i.e., not a wait or an all-zero code, the output of SR80 operates relay CS1, FIG. 5, and CS1 applies power to the dial oscillator, not shown.

The digit code in SR80 activates the dial during the next four clock pulses. At the end of the fourth clock pulse F4 in SR31, FIG. 6, is set. This condition enables *g*70 and *g*71, FIG. 7, to allow shifting to start again and inhibits *g*63, FIG. 9, to stop the readout.

Assuming that no wait or all-zero codes are in the memory, the cycle continues until all fifteen digits have been read out and the last one has been shifted back into the memory. At this time F16 of SR30 and F4 of SR31, FIG. 6, are reset. The information from these two flip-flops causes the dialer to come to rest with CS1, FIG. 5, CS2, FIG. 9, and the translate-out circuit, FIG. 5, disabled. If a wait code is encountered during the call cycle, CS1 is not enabled and no connections are made to the oscillator. The last clock pulse of the read interval joins with the wait signal via lead W2 to activate *g*5, FIG. 9, causing FF2 to reset. This action stops the clock pulser 204 at the beginning of the shift interval and disables CS2.

The clock pulser, FIG. 7, will not start again until the reset button RES, FIG. 9, is depressed, the record button REK, FIG. 8, is depressed, dial tone is detected, or the switchhook SW is depressed. Any of these actions will reset FF2 and allow the clock pulser to run again. If dial tone sets FF2, FIG. 9, the dialer cycles through the rest of the call as described above. If any of the actions described other than dial tone sets FF2, FF3 is also set. This action speeds up the clock to get the unit home quickly and disables *g*63 and *g*65. Disabling these gates prevents annoying clicks or tones from reaching the ear of the user as the unit cycles home.

If an all-zero code is encountered during a call (this will always happen when less than 15 digits were previously recorded), the dialer is reset as described above for the case when some action other than dial tone started it after a wait.

Logic Components

In the course of the preceding description, a number of the individual elements such as flip-flops, gates, inverters and the like have been mentioned only briefly, or in some cases omitted entirely, in order to preserve operational continuity in the description. To supplement the above description and to ensure completeness in the disclosure, the following sections set forth lists of the major component groups with descriptions or discussions of the structure and function of the components listed numerically within each group.

Flip-Flops

FF1, FIG. 8, in effect, remembers whether the dialer is in the call or record mode. It is reset during call and set during record. This flip-flop cannot be reset by the static signal on lead $\overline{H}$ as FF2 and FF3 are, because it must be set at the start of the record cycle before SR30 is set to change the signal on lead $\overline{H}$. It is for this reason that a pulsed signal on lead P16 is used to reset FF1.

FF2, FIG. 9, responds to various start-stop signals. It is normally set during call and reset during record. Any time the dialer is signaled to cycle home, FF2 gets set.

FF3, FIG. 9, gets set any time the dialer is reset. Its outputs speed up the clock and disable the translate-out circuit and the common switch relay CS2.

FF4, FIG. 9, remembers the position the switchhook was in when the dialer left home or was shifted into the record mode. As the switchhook then changes states, it will cause an output from *g*12 to reset the dialer.

FF5 and FF6, FIG. 8, operate with *g*21, *g*23, *g*24, and *g*25 to prevent the possibility of the customer accessing two memories at once.

FF7, FIG. 8, is set when the dialer is in the record mode but not in the LND record mode. The only purpose for this flip-flop is to differentiate between these two modes so that the record lamp will not be lighted during LND recording.

FF50 (FF50.1-FF50.L), FIG. 4, holds the desired memory activated during a cycle.

Gates

Gate 1, FIG. 8, produces an output whenever the WDC switch is closed during recording. This output sets F1–F3 and resets F4 of SR31, holds the clock pulser stopped, and enables the translate-in circuit so that information can be read into SR80. L1 of *g*1 functions with *g*35 to prevent excessively rapid dialing from causing errors in shifting during the record cycle. When the dialer is set up to record, but before a digit button has been pressed, there is a 0 on L1 of *g*35 which puts a one on lead 1 of *g*1, thus enabling *g*1. Then when a digit button is pressed, the signal on lead BI changes to a zero and operates on SR31 as described above. The setting of F1 in SR31 puts a zero on L2 of *g*35, holding its output at one. Thus, *g*35 continually holds *g*1 enabled during this time so that the information on lead BI will not be interrupted so long as the WDC contact is closed.

As soon as a depressed digit button is let up the clock pulser, FIG. 7, begins to run. The first clock pulse sets F4 of SR31, which produces a 1 on lead 1 of *g*35. The second clock pulse, which occurs no longer than 34 milliseconds after the digit button is released, resets F1 of SR31. This action applies a 1 to L2 of *g*35 which then produces a zero output and disables *g*1.

If a second digit button is pressed, it will have no effect until the next three clock pulses have gone by. Thus, to ensure accurate recording, the time between the release of one digit button and the depression of the next must be at least 34 milliseconds, and the time between releases of digit buttons must be slightly greater than 85 milliseconds. This requirement does not mean that a digit button must be held down for 85 milliseconds. It means instead that a button must be held down long enough for bit states in SR31 to change and the logic in the set to settle, which requires only a few microseconds at most.

L2 of *g*1 prevents the possibility of user confusion that might otherwise occur if a digit or wait button were pressed after the record button REK but before the name button NB with the phone on-hook. If this sequence of events occurred and if L2 of *g*1 were not used, F1–F3 would be set and F4 reset in SR31 while SR30 stayed entirely reset. Then, if the digit button were to be released, the clock pulser would start. The first clock pulse would set F4 of SR31. This action would produce a 1 on lead $\overline{CE}$ which would then combine with the output of IN47 to give a zero output from *g*30. This output would reset FF1 and the 1 output of FF1 would apply a 0 to L3 of *g*61 and stop the clock pulser.

In the sequence described immediately above, FF7 also resets thus turning off the record lamp RL. Upon seeing the record lamp off, the user, thus made aware of his error, presses the record button REK to restart the cycle. The user is required to hold the button down longer than 68 milliseconds, however, in order to set FF1 and FF7 because the output of *g*30 holds them reset for this amount of time. Eventual setting of these flip-flops takes place since the 1 output of FF1 remains so long as the set signal is applied, even in the presence of the reset signal. This condition allows the clock pulser to reset F4 of SR31 after four clock pulses, thus deactivating *g*30. At this point the dialer is in the record mode except that F1 of SR30 is set. The fact that F1 of SR30 is set is of no consequence since the operation of a name button will set it. The user could therefore proceed to record in the normal fashion.

It is to avoid the possible confusion indicated under the circumstances described immediately above that L2 of *g*1 is employed. This lead prevents the WDC switch from having any effect on the logic as long as the dialer is on-hook and not out of home.

L3 of *g*1 inhibits *g*1 except when the dialer is in the record mode. This action prevents a closure of the WDC contact from affecting the logic during the call cycle.

Gate 2, FIG. 9, prevents dial tone from setting FF2 unless the dialer is out of home and in the call mode. L2 of *g*2 is probably not essential, but it does prevent some possible problems. In the unlikely event that the record button REK and a name button NVB were pushed at about the same time, an unwanted clock pulse could escape at the beginning of the recording were it not for L2 of *g*2. It is also possible, without this lead, that the dialer may be reset during the initial part of the record cycle. These problems and other possible problems are prevented by L2 of *g*2 in that this lead prevents FF2 from being set by inhibiting *g*2 until a 1 appears on the $\overline{H}$-lead. By the time this action occurs, FF1 will have been set so that it can inhibit *g*2.

Gate 3, FIG. 9, provides an output to set FF2 when the output of *g*2 or *g*18 is zero.

Gate 4, FIG. 9, produces an output to reset FF2 when the output of *g*5 or the signal on lead $\overline{H}$ is zero.

Gate 5, FIG. 9, prevents the wait signal from stopping the clock until the end of the "read" interval, which interval is defined as the time during which the translate-out circuit puts out information. When the translate-out circuit produces a wait signal, a 1 is applied on L1 of *g*5. During the last clock pulse of the read interval, a 1 is applied to L2 of *g*5 causing FF2 to be reset. The output of *g*5 persists only so long as both outputs of F4 in SR31 are zero. When the 1 output changes, the signal on the OE lead changes to zero and turns off the wait signal. The use of gate 5 also avoids employing an extra manual button in lieu of dial tone; it also allows for a pulse type of dial tone detector. If the dialer is started by the reset button RES, record button REK, or switchhook SW, the clock will speed up and the three clock pulses will only take a few hundred microseconds.

Gate 6, FIG. 8, functions in the LND recording mode of operation. L2 inhibits the gate when the phone is on-hook, whereas L1 inhibits it when the dialer is out of home. It is essential that the gate be inhibited when the dialer is out of home during recording since otherwise, *g*19 would be activated in response to the operation of each digit button. This feature is discussed at greater length hereinbelow in connection with the description of *g*19.

If the phone is taken off-hook with the dialer in the rest position and a digit button is pressed, the output of *g*6 puts the dialer in the record mode by setting FF1 and FF7, activates the LND memory and sets SR30. The setting of SR30 causes lead $\overline{H}$ to change to a 1. It is at this point that the dialer is described as being "out of home."

Gate 7, FIG. 8, allows a 0 from *g*6 or from the record button to set FF1. The output from *g*7 is also an input to *g*19. This arrangement allows the operation of the record button REK to reset the dialer via *g*19. Closing the WDC switch, which also activates *g*7, must not reset the dialer however.

Gate 8, FIG. 8, prevents a possible timing problem which might otherwise arise during the LND record mode of operation. This mode is initiated by an output from *g*6 which sets FF1 and part of SR30. For correct operation, it is essential that a 0 from FF1 inhibits *g*37 before a 1 from IN44 can activate that gate. If *g*8 is omitted and the output of *g*6 is fed through an inverter into *g*22, the proper timing might not occur. Whether the proper timing would occur depends upon the speed of propagation through the circuits involved. The use of *g*8, however, avoids the need for controlling this speed since *g*37 is inhibited at the same time that *g*8 is enabled.

Gate 9, FIG. 8, permits SR30 to be set via *g*41 when the dialer is off-hook or in the record mode. This gate is needed to permit recording on-hook.

Gate 10, FIG. 8, permits the output of *g*30 or *g*11 to reset FF1 and FF7.

Gate 11, FIG. 8, resets FF1 in response to a signal from *g*12 if the dialer is in the home position. The user may decide to record some number, either on or off-hook, but might then be interrupted just after pushing the record button REK. Gate 11 allows the reset button RES or a transition of the switchhook SW to reset FF1 and FF7. The gate prevents FF1 from being reset if the dialer is out of home in the record mode. FF1 must stay set all during the record cycle so that all zeros will be recorded after the last digit of the number being stored.

Gate 12, FIG. 8, gives an output when any of its inputs become 0. This output resets the dialer.

Gates 13–17, FIG. 8, cause an output from *g*12 for resetting the dialer any time the switchhook SW changes position after the dialer leaves home or shifts into the record mode. If the phone is on-hook when the dialer leaves the home position, *g*13 produces an output when the phone goes off-hook. Gate 14 responds to the reverse condition.

Gates 15, 16, and 17 allow FF4 to respond to the switchhook only when the dialer is home and not in the record mode. It should be noted that when FF4 does respond to the switchhook, a short pulse is generated at the output of *g*12. This condition occurs since *g*13 or *g*14 is activated when a switchhook transition occurs before FF4 can change states. The output pulse from *g*12, generated as described, can only occur when the set is in the rest condition and accordingly is of no consequence.

Gate 18, FIG. 9, prevents the output of *g*12 from reaching *g*3 and FF3 when the dialer is at home. Without this gate, short pulses would reach *g*3 and FF3 every time the phone went on- or off-hook even though the dialer was not being used. These pulses, which would be only two or three package delays long, could momentarily set FF3 and FF2. Although there are no obvious malfunctions which would result from this condition, the signals described represent unneeded noise in the logic circuit and are therefore inhibited by *g*18. In any event, if *g*18 were removed, an inverter would be required in its place.

Gate 19, FIG. 9, functions with *g*7 to cause pushing of the record button REK to reset the dialer if it is out of home. This sequence ensures that the dialer will be reset for recording on-hook. The user may record on-hook and neglect to push the reset button RES, thus leaving the dialer out of home. If at some later time the user decided to record a second number on-hook without having gone off-hook since the first recording, the digits of the second number would be recorded on the end of the first number rather than in the desired memory slot were it not for the action of the record button REK which resets the dialer.

Lead L2 on *g*19 prevents *g*19 from producing a reset pulse at the beginning of an LND record cycle. When the WDC switch closes at the beginning of the cycle, *g*7 applies a 1 to L3 of *g*19. A short time later, the signal on lead $\overline{H}$ changes to a 1. In the absence of L2 on *g*19, the 1 on lead $\overline{H}$ would activate *g*19 momentarily and cause *g*12 to produce a reset pulse which may set FF2 and FF3. At that point the dialer would then attempt to reset, but if upon arriving at the rest position the WDC switch were still closed, the dialer would run through the entire cycle again and would continue repetitively until the WDC switch were released. The logic would then come to rest in the home position. FF1 may be reset during the cycling since IN35 is quite slow. In any event, under these conditions, LND recording would not be possible.

The use of L2 on *g*19 prevents the malfunction in the following manner. When the LND memory is accessed, a 1 appears on lead S. This 1 is applied to IN13 which inhibits *g*19. A short time later the signal on lead $\overline{H}$ becomes a 1. This 1 cannot activate *g*19, however, since the signal on lead S is holding it disabled. The 1 on lead $\overline{H}$ is applied to IN6, thus causing the output of *g*7 to change back to a 0. At the same time, the 1 on lead $\overline{H}$ is applied to IN35 which causes the signal on lead S to change back to a 0. Proper operation of the circuit requires that the output of *g*7 change to a 0 before the signal on lead S changes to a 0.

Gate 20, FIG. 8, prevents the record button REK from setting FF1 when the dialer is out of home. If this gate were not used, and the record button were pushed during a call, the number that was being dialed would be erased from the memory.

Gate 21, FIG. 8, was discussed hereinabove under FF5.

Gate 22, FIG. 8, causes the output of *g*8 or the LND switch to activate the LND memory.

Gates 23, 24, and 25, FIG. 8, were discussed hereinabove under FF5.

Gate 26, FIG. 9, causes the call lamp CA to light when the dialer is out of home and in the call mode.

Gate 30, FIG. 6, resets FF1 and FF7 during the last clock pulse of each cycle. The reset pulse is present only during the time that the 0 output F16 in SR30 and the 1 output of F4 in SR31 are both 1's. This time interval is approximately the same as the interval between the 01 clock pulse and the end of the 02 clock pulse during the last pulse of the cycle.

Gates 31, 32, and 33, FIG. 6, cause every eighth clock pulse to be counted by SR30. The count occurs at the end of the shift interval, i.e., the interval during which information is being shifted from SR80 to the memory.

Gate 35, FIG. 6, was discussed hereinabove under *g*1.

Gate 36 allows the output of *g*1 to set F1–F3 of SR31 during record or the output of *g*37 to set F1–F3 of SR31 during call.

Gate 37, FIG. 6, prevents the signal on the S-lead from setting F1–F3 of SR31 and F1 of SR30 during record. This gate is needed for the LND mode of operation but it functions any time the dialer is in the record mode. It fixes the record cycle so that information is entered into SR80 before any shifting is done and so that only 15 shifts are made during the cycle. Thus the first digit of a number is recorded over the information which was present in SR80 in the home position. The information in SR80, after the recording, is the last digit of the number that was previously stored in the memory. This information is extraneous at that point and is not used.

Gates 38 and 39, FIG. 6, prevent SR30 from being set at the beginning of the call cycle until after SR31 has been set. If the signal on lead HE were to become a 1 while the signal on lead CE were still 1, *g*63 would be energized at the beginning of the call cycle. This condition would enable the translate-out circuit which could then generate an ALLO code and reset the dialer.

Gate 40, FIG. 6, is used to make the dialer essentially insensitive to contact bounce in the WDC switch. Gate 40 also causes a 1 to appear on L1 of *g*61 when the digit button is depressed even though F4 of SR31 is not set. This function is necessary to permit the clock pulser to start when a digit button is released.

Gate 41, FIG. 6, prevents a 1 on lead S from reaching SR30 and SR31 with certain specific exceptions. L1 of *g*41 is required because of the excessive time that might otherwise elapse, after SR30 is set, before the signal on lead S changes to a 0. This time could be as long as the 02 clock pulse and could, under various conditions, result in malfunctions of the logic circuit. The function of L3 on *g*41 which was discussed in some detail hereinabove under FF5 is primarily to prevent the accessing of two memories at once and to permit recording on-hook.

Gate 42, FIG. 6, ensures that F1 of SR31 is always reset at the start of a record cycle.

Gate 50 (50.1–50.47, 50.L), FIG. 4, is a 48-input gate that produces an output when any of the name buttons are depressed and the signal on lead H is a 1. This output operates on SR30 and SR31 to start the cycle if *g*41 is enabled.

Gate 51, FIG. 4, accesses the proper memory by gating 01G2 into it.

Gate 53, FIG. 4, gates in the signal from each NA switch to access a desired memory. A 1 on L1 of *g*53 produces a 0 at the $\overline{S}$-terminal of FF50 and sets it. When a 0 appears on lead H the output of *g*53 is returned to a 1. This operation effectively locks out all of the name buttons when the dialer is out of home, since all *g*53's are inhibited.

Gate 55, FIG. 4, ensures that one of the FF50's will be set at the beginning of each cycle. This gate causes the reset signal to be removed from these flip-flops at about the same time that the set signal is applied. The reset signal is not reapplied until the end of the cycle. If the H-lead were connected directly to the $\overline{R}$-terminal of these flip-flops, the circuit could malfunction, since the set and reset signals might both be removed at the same time when the H-lead signal changed to 1. Gate *g*56, FIG. 4, reduces the fanout from IN71 by a factor of 60 and avoids unneeded pulses from being generated in the memory cells. Such unneeded pulses would be caused by the feedback loops of the bits in all memory registers being opened by each 02 clock pulse if gate *g*56 were not used.

Gate 58, FIG. 4, is a 48-input gate that gates the outputs from memory to SR80. The output of each SR50 is such that all inputs to *g*58 are 1 when $\overline{\phi 1}$ is 0. When $\overline{\phi 1}$ changes to 1 in a given memory, the associated input to *g*58 takes on the signal that is present at the output of F60 in that memory. It is in this way that the information from a particular memory register is fed into SR80.

Gate 60, FIG. 9, controls the clock pulser during the call cycle and any time the dialer is reset and cycling home.

Gate 61, FIG. 9, controls the clock pulser during the record cycle.

Gate 62, FIG. 9, gives a 1 output when the output of *g*60 or *g*61 is a 0. A 1 at the output of this gate enables the clock pulser.

Gate 63, FIG. 9, provides an output which enables the translate-out circuit. This gate gives a 0 output when the dialer is out of home, in the call mode, in the read interval but not in the fast clock mode.

Gate 64, FIG. 9, causes all 0's to be recorded as the dialer cycles home after being reset in the record mode. The translate-in circuit records all 0's when it is enabled but has no input from the dial.

Gate 65, FIG. 9, causes relay CS2 to be operated whenever the dialer is dialing out. It removes power from CS2 during a wait under the influence of FF2. When an all-zero code is detected, FF3 is set which inhibits g65 for the rest of the cycle. Lead $\overline{H}$ or lead $\overline{HE}$ is needed as an input to this gate to keep it from being enabled momentarily at the end of a cycle. Gate 65 could be momentarily enabled because of FF3 being reset before FF2.

Gate 66, FIG. 9, produces a 1 output when a 0 is present on lead B1 on the output of *g*64. This output from *g*66 enables the translate-in circuit thus permitting recording.

Gates 70 and 71, FIG. 7, function during the call cycle to allow shifting of information from SR80 to SR50 every other four clock pulses. These gates operate during the record mode to allow shifting after a digit button is released.

Gate 72, FIG. 7, allows a $\overline{\phi 1}$ to be pulsed out whenever $\phi$2 is pulsed out, which is to say that $\phi$2 enables *g*72 so that $\phi$1 can pass through it.

Gates 73–76, FIG. 7, permit only whole clock pulses to be released under the control of lead CG1E. Regardless of when the enabling signals appear or disappear on CG1E, only whole clock pulses are produced by the clock pulser.

Gates 91–94, FIG. 7, are discussed hereinbelow under the heading Delays.

Gates 103–110, FIG. 5, together with associated inverters with like designating numbers make up the translate-out circuit. Information comes from SR80 in a modified BCD code and is translated by these gates into a 2-out-of-7 code used to operate the relays RL2, RL3, RL4, RH2, and RH3 which in turn selectively introduce resistors into the R-C feedback path of the dial signal oscillator (not shown). Details of such an oscillator arrangement are shown by Breedan and Rickert in the U.S. patent cited hereinabove.

TRANSISTORS (BIPOLAR)

Transistors Q10, FIG. 8, Q11 and Q12, FIG. 9, and Q13, FIG. 5, provide current gain for operating, respectively, the record lamp RL, the call lamp CL, relay CS2 and relay CS1.

TRANSISTORS (UNIPOLAR)

IGFETS Q1, FIG. 9, and Q2, Q3, Q4, Q5, and Q6, FIG. 8, each of which is associated with a ground connection or voltage source, operates in effect as a load resistor to maintain a constant voltage level at various points in the circuit, depending on the operating state of associated switches, e.g., Q5 is associated with the WDC switch.

IGFET Q50 (i.e., Q50.1–Q50.47, Q50.L), FIG. 4, in each of the individual memories 1–47 and in the LND memory serves in each case as a load resistor between the upper input to *g*53 and ground to hold the input at 0 when NA opens.

IGFETS Q81, Q82, Q83, and Q84, FIG. 5, serve as load devices for the dial button contacts L1, L2, L3, H1, H2, and H3.

IGFETS Q85, Q86, Q87, and Q88, FIG. 5, serve as gating devices for inputs to SR80.

DIODES

Diodes CR81–CR84, FIG. 5, together comprise a translating circuit which converts the 2-out-of-6 code of the dial buttons into binary language for entry into SR80.

Inverters

From a logic standpoint, the functions of the inverters employed are generally obvious. It is also evident, however, that a number of the inverters do not contribute to the logic function per se. For example, inverters 72, 73, and 83, among others, could all be removed with no effect on the logic itself.

Such logically redundant inverters, however, perform necessary functions which are not directly related to the logic arrangements. A number of the inverters, such as those indicated immediately above, are used to drive large capacitive loads. To drive such loads in a reasonable amount of time requires physically large insulated gate field effect transistors (IGFETS), and since an inverter has fewer IGFETS than a gate, large loads can be driven economically by employing inverters. Even though extra logic packages are required, the silicon area used can be reduced.

A second need for inverters is the need to drive bipolar output transistors where dc current is required. The advantage secured is once again economy in silicon area. Still another use to which inverters are put in accordance with the invention is that of receiving outputs from the shift registers. The amount of capacitance on the nodes of the individual bits in the shift registers must be rather closely controlled and the use of inverters facilitates such control.

Delays

A total of four delays, 91 through 94, are employed in the clock circuit. Any one of a number of conventional circuits may be utilized to produce the particular delay characteristics required. These characteristics include providing a few microseconds of delay when the input changes from 0 to 1 but very little delay when the input changes from 1 to 0. With each delay, an inversion takes place.

Clock Operation

The logical states shown at various points in the clock logic, FIG. 7, of the clock pulser are those that would be present between clock pulses. The NR circuit merely serves to produce a square-wave output in response to the 60 Hz sine wave on lead PC. When the signal on lead PC changes to 1, a 1 is applied to the input of D91 and *g*91. The output of IN90 thus rises to a 1. This output marks the start of 02. The 1 at the input of D91 propagates through that delay and through IN92 and is applied to the input of *g*90, causing the output of *g*90 to change to a 0. This change marks the start of $\overline{01}$. D91 thus creates the delay between the start of 02 and the start of $\overline{01}$. The 1 at the input of D92 propagates through that delay where it becomes a 0 and causes the output of *g*90 to return to a 1. This action ends $\overline{01}$. The length of $\overline{01}$ is thus the delay introduced by D92. The 0 at the input of D93 propagates through that delay in a very short time and becomes a 1 at the input of D94. This 1 propagates through D94 and becomes a 0 at the input of *g*91 which ends 02. This action completes the generation of the two phase clock pulse. The propagation time through D94 is, therefore, the time between the end of $\overline{\phi 1}$ and the end of $\phi 2$. This division assumes that the delay for a $\phi$ to go through D93 is neglibible. The length of $\phi 2$ is the sum of the propagation times for D91, D92, and D94.

When PC changes back to a 1, the clock logic resets itself without changing the states of $\overline{\phi 1}$ and $\phi 2$. This condition is made possible by the fact that the signals on L1 of *g*90 and *g*91 change to 0's before the signals on L2 changes to 1's.

When the signal on lead FC changes to a 1 to speed up the clock, it inhibits *g*94 and enables *g*93. This action feeds the output of D94 back into the input of D91 and causes the clock to run freely. It is in this mode that D93 functions. When the clock logic is resetting between clock pulses, 0's are propagated through all delays except D93. It is the propagation of a 1 through D93 that controls the time between clock pulses when the clock is in the "free run" or fast clock mode.

It is to be understood that the embodiment described herein is merely illustrative of the principle of the invention. Various modifications thereto may be effected by persons skilled in the art without departing from the spirit and scope of the invention.

What is claimed is:

1. A repertory dialer telephone set comprising, in combination, an array of station buttons on the face of said set each identifiable with visual indicia of a respective party whose number is to be recorded or called, a pushbutton dial including a plurality of digit buttons for translating each decimal digit dialed into an *n*-out-of-*m* code, a plurality of switches each operable in response to the depression of a corresponding one of said station buttons, a plurality of electronic circuit storage means each associated with a particular one of said switches, means for translating said *n*-out-of-*m* code employed in the operation of said dial into digital form on a digit-by-digit basis, means for temporarily storing each successive dialed digit in said digital form, means operative in the record mode for extracting a digit from said last-named means and entering said last-named digit in one of said circuit storage means, first means operative in the call mode for extracting digital indicia of a number stored in one of said circuit storage means and for entering said indicia serially on a digit-by-digit basis into said means for temporarily storing, second means operative in the call mode for extracting said last-named indicia in parallel form from said last-named means, means operative in the call mode for utilizing said last-named indicia for generating multifrequency dial signals in said *n*-out-of-*m* code, a dial tone detector, said first means being jointly responsive to an output signal from said detector, to the operation of one of said switches and to a telephone switchhook transfer, said first means including a clock pulse generating circuit, means for counting the pulse sequences generated by said generating circuit, said counting means developing output signals at periodic intervals during call mode operation, each of said circuit storage means being responsive to said last-named signals for reading out digital information to said means for temporarily storing.

2. A repertory dialer telephone set comprising, in combination, an array of visual display spaces for recording visual station indicia whose numbers are to be recorded or automatically called, a plurality of switches each operative in response to the depression of one of said spaces, a pushbutton dial for converting the decimal digit of an operated button into signal indicia in an *n*-out-of-*m* code, a plurality of electronic storage circuits each corresponding to and accessed by a respective one of said switches, a shift register for temporarily storing the digital indicia of a single decimal digit, means for converting said signal indicia in said *n*-out-of-*m* code into digital indicia and for entering said last-named indicia in parallel fashion into said shift register, means for extracting said last-named indicia from said shift register in serial form and storing said last-named indicia in a designated one of said storage circuits, means for extracting said last-named indicia from said last-named circuits in serial fashion and storing said last-named indicia in said shift register, means for extracting said last-named indicia from said shift register in parallel fashion and converting said last-named indicia into signal indicia in an *n*-out-of-*m* code, and means responsive to said last-named indicia for generating multifrequency dial signals, logic circuitry for controlling the sequence of operations of said set in both the call and record mode, said logic circuitry being in one of a plurality of intermediate states or conditions during the course of an operating sequence and in a home state or condition when ready for the start of a full record or call cycle, a reset button and corresponding switch, a record button and corresponding switch, a switchhook, and means responsive to the operation of said reset button or said record button or said switchhook for placing said set electronically in said home condition.

3. A repertory dialer telephone set comprising, in combination, a plurality of memory circuits each including a respective shift register for storing digital indicia of a respective telephone number, first means including a like plurality of switches each operable manually from the face of said set for accessing a respective one of said memory circuits in either the record or call mode of operation, a pushbutton telephone dial, second means responsive to the operation of said dial with said set in a record mode of operation for storing in digital form the decimal digits of a dialed number in that one of said memory circuits identified by an operated one of said switches, and third means responsive to the operation of one of said switches with said set in a call mode of operation for automatically dialing out in multifrequency code form a telephone number extracted from that one of said memory circuits corresponding to said last-named switch, said second and third means including a common shift register, said second means including means for translating signals from an *n*-out-of-*m* code generated by said dial into digital information and directing said information into a preselected one of said memory circuits by way of said shift register, said third means including means for translating information from binary form to *n*-out-of-*m* code form and means for transferring digital indicia stored in one of said memory circuits by way of said shift register and by way of said last-named translating means for the generation of multifrequency dial signals. spaces for recording visual station indicia whose numbers are to be recorded or automatically called, a plurality of switches each operative in response to the depression of one of said spaces, a pushbutton dial for converting the decimal digit of an operated button into signal indicia in an *n*-out-of-*m* code, a plurality of electronic storage circuits each corresponding to and accessed by a respective one of said switches, a shift register for temporarily storing the digital indicia of a single decimal digit, means for converting said signal indicia in said n-out-of-*m* code into digital indicia and for entering said last-named indicia in parallel fashion into said shift register, means for extracting said last-named indicia from said shift register in serial form and storing said last-named indicia in a designated one of said storage circuits, means for extracting said last-named indicia from said last-named circuits in serial fashion and storing said last-named indicia in said shift register, means for extracting said last-named indicia from said shift register in parallel fashion and converting said last-named indicia into signal indicia in an *n*-out-of-*m* code, and means responsive to said last-named indicia for generating multifrequency dial signals, logic circuitry for controlling the sequence of operations of said set in both the call and record mode, said logic circuitry being in one of a plurality of intermediate states or conditions during the course of an operating sequence and in a home state or condition when ready for the start of a full record or call cycle, a reset button and corresponding switch, a record button and corresponding switch, a switchhook, and means responsive to the operation of said reset button or said record button or said switchbook for placing said set electronically in said home condition.

3. A repertory dialer telephone set comprising, in combination, a plurality of memory circuits each including a like plurality of switches each operable manually from the face of said set for accessing a respective one of said memory circuits in either the record or call mode of operation, a pushbutton telephone dial, second means responsive to the operation of said dial with said set in a record mode of operation for storing in digital form the decimal digits of a dialed number in that one of said memory circuits identified by an operated one of said switches, and third means responsive to the operation of one of said switches with said set in a call mode of operation for automatically dialing out in multifrequency code form a telephone number extracted from that one of said memory circuits corresponding to said last-named switch, said second and third means including a common shift register, said second means including means for translating signals from an $n$-out-of-$m$ code generated by said dial into digital information and directing said information into a preselected one of said memory circuits by way of said shift register, said third means including means for translating information from binary form to $n$-out-of-$m$ code form and means for transferring digital indicia stored in one of said memory circuits by way of sqid shift register and by way of said last-named translating means for the generation of multifrequency dial signals.

* * * * *

UNITED STATES PATENT OFFICE
CERTIFICATE OF CORRECTION

Patent No. 3,670,111 Dated June 13, 1972

Inventor(s) Allen A. Bukosky, Michael A. Flavin, Donald G. Hill, Donald D. Huizinga, James F. Ritchey It is certified that error appears in the above-identified patent and that said Letters Patent are hereby corrected as shown below:

Col. 3, line 16, "01" should be --Ø1--;
line 18, "02" should be --Ø2--;
line 20, "01G1" should be --Ø1G1--, "01" should be --Ø1--;
line 21, "02G1" should be --Ø2G1--, "02" should be --Ø2--;
line 22, "01G2" should be --Ø1G2--, "01" should be --Ø1--;
line 23, "02G2" should be --Ø2G2--, "02" should be --Ø2--;
line 37, change "541,191" to --641,191--.
Col. 6, line 44, "01" should be --Ø1--;
line 45, "02" should be --Ø2--.
Col. 8, line 33, after "have" cancel "been" and substitute --between--.
Col. 12, line 26, change "NVB" to --NB--.
Col. 14, line 32, "01" should be --Ø1--;
line 33, "02" should be --Ø2--;
line 70, "02" should be --Ø2--.
Col. 15, line 28, "02" should be --Ø2--.
Col. 16, line 75, "02" should be --Ø2--.
Col. 17, line 3, change "$\overline{01}$" to --$\overline{Ø1}$--;
line 4, change "02" to --Ø2--, change "$\overline{01}$" to --$\overline{Ø1}$--;
line 7, change "$\overline{01}$" to --$\overline{Ø1}$-- in both instances;
line 11, change "02" to --Ø2--;
line 14, change "Ø" to --0--;
Col. 18, line 54, (claim 3) after "signal." cancel "spaces for"; lines 55 through 75, cancel in their entirety.
Cols. 19 and 20, cancel in their entirety.

Signed and sealed this 6th day of March 1973.

(SEAL)
Attest:

EDWARD M.FLETCHER,JR.
Attesting Officer

ROBERT GOTTSCHALK
Commissioner of Patents